United States Patent [19]

Olsson

[11] Patent Number: 4,613,005

[45] Date of Patent: Sep. 23, 1986

[54] UNITIZED SEAL FOR SEVERE SERVICE APPLICATIONS

[75] Inventor: Burton K. Olsson, Park Ridge, Ill.

[73] Assignee: Chicago Rawhide Manufacturing Co., Elgin, Ill.

[21] Appl. No.: 622,621

[22] Filed: Jun. 20, 1984

[51] Int. Cl.$^4$ ............................................. E21B 10/22
[52] U.S. Cl. .................................... 175/371; 175/359; 277/92
[58] Field of Search ............... 175/359, 371, 227, 228; 277/92; 384/94; 305/11

[56] References Cited

U.S. PATENT DOCUMENTS

| | | | |
|---|---|---|---|
| 1,862,887 | 6/1932 | Durdin, Jr. | 277/92 X |
| 2,559,964 | 7/1951 | Jensen | 277/92 X |
| 3,241,843 | 3/1966 | Hatch et al. | 277/42 X |
| 3,272,519 | 9/1966 | Voitik | 277/92 |
| 3,279,804 | 10/1966 | Blair | 277/92 |
| 3,572,452 | 3/1971 | Winberg | 175/371 |
| 3,844,363 | 10/1974 | Williams, Jr. | 175/371 X |
| 3,909,076 | 9/1975 | Kato | 305/11 |
| 4,509,607 | 4/1985 | Saxman et al. | 175/371 X |

Primary Examiner—James A. Leppink
Assistant Examiner—Matthew Smith
Attorney, Agent, or Firm—James T. FitzGibbon; Angelo J. Bufalino

[57] ABSTRACT

The present invention is directed to a grit exclusion and oil retention seal for use in extremely hostile environments. These environments include, but are not limited to sealing oil within cavities forming parts of earth drilling bits and the like. Seals such as these, include the ability to seal oil within a cavity in a reliable manner even under extreme conditions of vibration, mechanical shock, and the presence of grit, sand, water, dirt and mixtures thereof. In order to function properly in this environment, the seal must also provide a certain amount of axial end play so that relative movement of the sealed parts will not permit the seal to leak.

In this connection, a heavy duty seal of the type with which the invention is concerned must provide not only a primary or relatively moveable seal, but also a secondary seal. The seal assembly must include means for transmitting torque from the housing or carrier to the primary seal rings. Means must be present for applying and maintaining an axial end face load of the proper range.

13 Claims, 4 Drawing Figures

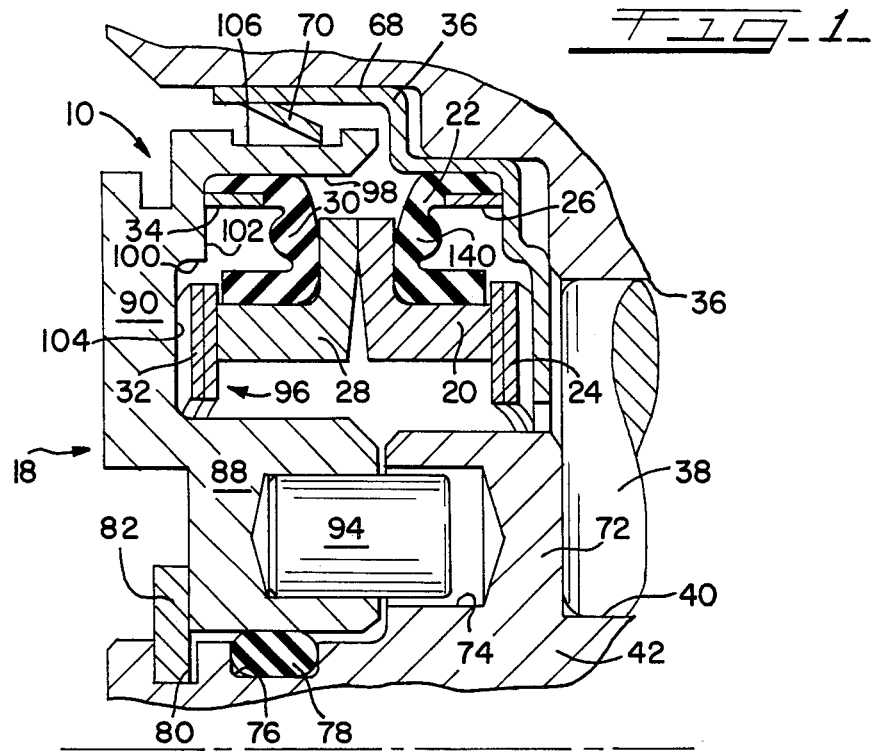
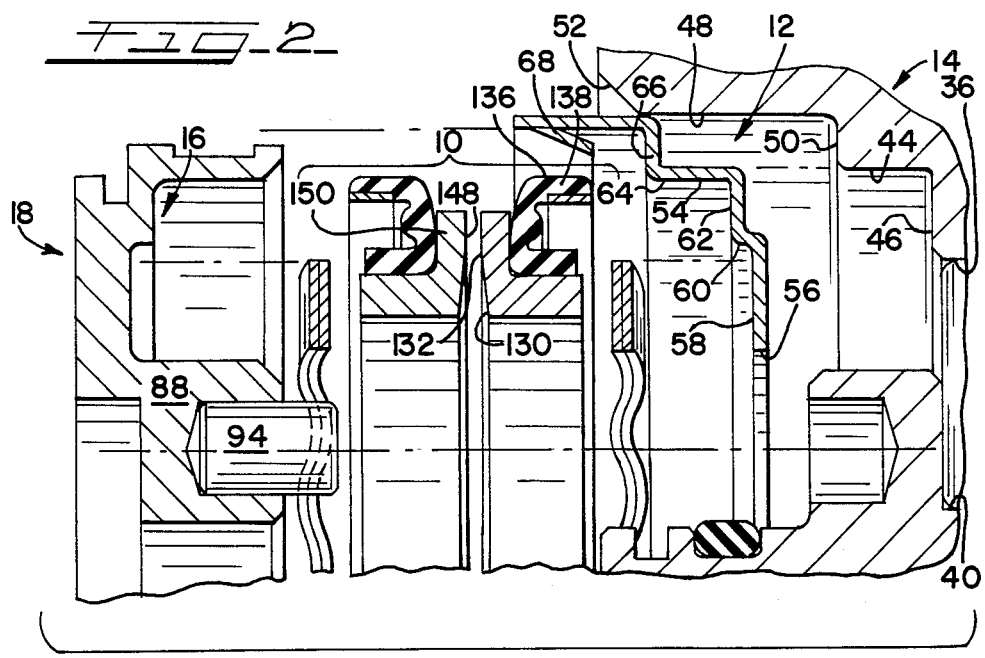

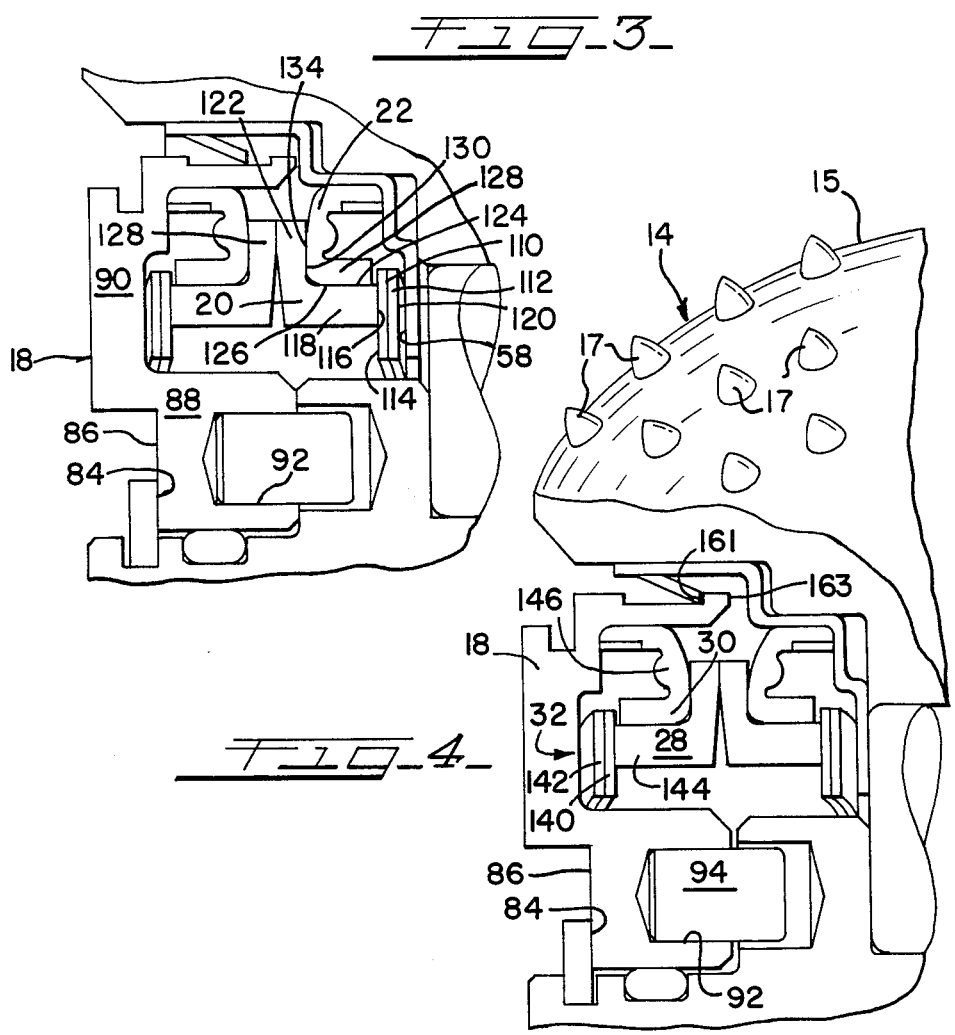

UNITIZED SEAL FOR SEVERE SERVICE APPLICATIONS

BACKGROUND OF THE INVENTION

The present invention relates generally to seals, and more particularly to a mechanical end face seal which is adapted to use in extremely severe working environments.

Some years ago, improvements were made in end face seals, with the result that, for many applications, seals would quite literally last the entire lifetime of the sealed mechanism. In order words, the sealed part, or other parts associated with it, would wear out before the seal itself would require replacement. Prior to that date, sealed mechanisms exposed to severe environments required expensive seal replacement, in turn causing inconvenience and expensive "down time," the use of replacement parts and labor, etc. A seal of the type which was an effective "lifetime" seal is shown in U.S. Pat. No. 3,241,843. Since that time, some improvements have been made in these mechanisms, but the basic design is sound and has proved very successful.

As is often the case, however, even excellent products are capable of further improvement, and even very rugged products are sometimes placed in environments which are so severe that they do not have the anticipated life they would have in less severe circumstances.

The present invention relates to a seal which is intended for use with rock drills, to act as a drill bit seal so as to exclude grit from a sealed region while retaining lubricant therein. Rock drills, by their nature, are exposed to abrasive grit, and, moreover, are subjected to severe vibration over a wide range of frequencies. Seals of this type may also sometimes encounter abrasive materials as well as clays and the like which may be strongly acidic or alkaline.

Prior seal designs used in rock drill and like environments have not been particularly successful. These seals lacked the ability to seal under conditions of severe impact and vibration.

A typical seal of the present invention is exposed to the epitome of severe conditions. A preferred application for this seal is in rock crusher drills of the so-called "raise bore" type. These rock crusher/drilling machines used in "raise boring" operations are well known to those skilled in the art. They generally include a gigantic main frame which is rotated by an extremely powerful motor about the axis of a fixed shaft. This frame in turn contains a large number of rock bit carriers, each of a clevis or bifurcated form. These elements on the carrier locate the two ends of a fixed spindle or shaft which extends centrally through a bit. The bit itself resembles a large tapered roller bearing, containing on its outer surface a plurality of rows of individual, very hard spikes, customarily made from tungsten carbide or the like. In use, the frame is rotated, moving with it the carriers affixed thereto; the drill bits mounted on the carriers spin about the axis of the spindle or the like by reason of being journalled on bearings, and permit the drill bit to apply a crushing force to the rock or other surface disposed about it. The expression "raise boring" derives from the fact that, in use, the frame is moved upwardly to drill a vertical bore from an existing mine shaft to another mine shaft lying on a higher level, or to drill to and through the surface of the earth for purposes of ventilation, excavation or the like.

The seals just described preferably use specialty rubbers such as fluoroelastomers or the like in a novel configuration, in combination with primary seal rings and auxiliary springs and retainers for use in severe environments.

Previous seals intended for this purpose having lacked one or more advantages or characteristics desirable in these applications, it is an object of the present invention to provide an improved composite end face seal for use in severe service environments.

Another object is to provide a seal with a pair of identical elements, arranged in mirror image form and adapted in use to cooperate to provide a rugged and reliable end face seal.

Another object is to provide a seal having an annular secondary seal member with a pair of axial flanges joined to each other by a contoured web of a particular cross-section.

Still another object is to provide a seal having primary rings of generally L-shaped cross-section, with radial flanges being ground or otherwise finished so as to provide an effective abutting primary end face seal.

A further object is to provide a seal unit having opposed primary rings urged axially into primary sealing engagement by wave-type springs which act directly on the seal rings.

A still further object is to provide a secondary seal unit or a seal assembly, which secondary unit provides a secondary seal and also locates the primary rings with respect to the counterbore and which may or may not contribute to the seal end face load.

Yet another object is to provide a novel end face seal which can be pre-assembled or unitized for shipment and installation so as to reduce cost and improve reliability.

A still further object is to provide a seal which withstands vibration and operates successfully in a highly abrasive environment.

A still further object of the invention is to provide a so-called mirror image, three-piece seal which consists of right and left hand seal pairs, each made from identical springs, primary rings, and secondary members, unitized by a pair of seal carriers.

Yet another object is to provide a seal unit which will be effective under a wide range of axial movement, and which will be effective to seal the lubricated cavity without excessive force application which might cause premature wear.

Still another object of the invention is to provide a seal which includes or is adapted to include its own housing unit which is compatible with a drill bit carrier or drive shaft assembly so that the seal and its carrier may be manufactured to close tolerances at the factory, shipped as an assembly, and installed without destructive or damaging disassembly and reassembly.

A further object of the invention is to provide a cartridge or unitized seal assembly which includes pairs of primary and secondary seal rings with auxiliary springs and clamp rings, with one-half of the symmetrical or mirror image seal being carried in a unitizing casing of stamped or drawn material with the other portion being carried by or received in a machined seal ring carrier.

A still further object of the invention is to provide a unitized type seal which may be installed reliably, that is, which, when installed, will in effect advise the operator that the installation is complete and correct.

A still further object of the invention is to provide a seal cartridge which includes a pair of carrier units for two preassembled seal halves, one carrier unit having surfaces adapted to engage a counterbore to a predetermined depth or installed "height" with the other carrier being a machined assembly adapted to be positioned by a snap ring or the like and held against rotation by drive pins or the like.

Another object of the invention is to provide a unitized seal arrangement which may be installed in place as a simple operation at the same time a drilling bit or the like is installed, and which permits removal and replacement of the seal without requiring removal or replacement of other rotary sealed parts.

The foregoing and other objects and advantages of the invention are achieved in practice by providing a seal unit comprising a pair of assemblies, each have three substantially identical components including a wave type spring element, a primary seal ring of generally L-shaped cross-section and having radial and axial flanges, with one radial flange having an end face seal band surface thereon and an opposite surface as well as a radially outer axial surface being adapted to receive a secondary ring, and a secondary seal ring made from an elastomer, being of annular form and having a generally U-shaped cross-section.

The invention is also carried into practice by providing a cartridge-type seal which includes a pair of cooperating seal carriers having means permitting them to be locked together or preassembled and lubricated, and which is designed to permit ready installation with associated sealed parts at the work site, with one carrier being a drawn or stamped carrier and the other being machined carrier and the carriers having cooperative locking or unitizing mean thereon which prevent unattentional disassembly but which permit the seal to operate through an intended range of install tolerances or "working heights" during operations.

The exact manner in which these and other objects and advantages of the invention are carried into practice will become more clearly apparent when reference is made to the accompanying detailed description the preferred embodiments set forth by way of example, and to the accompanying drawings wherein like reference numerals indicate corresponding parts throughout.

BRIEF DESCRIPTION OF THE DRAWINGS

FIG. 1 is a vertical sectional view, with portions broken away, showing the novel seal of the invention installed in place within its intended working environment;

FIG. 2 is an exploded sectional view similar to that of FIG. 1, but showing principal components of the novel seal prior to assembly and installation;

FIG. 3 is a sectional view similar to that of FIG. 1, shown without cross hatching for clarity of illustration; and FIG. 4 is a sectional view similar to FIG. 3, also shown without cross hatching, and showing another position of the seal of the invention in place in its working environment.

DESCRIPTION OF THE PREFERRED EMBODIMENTS OF THE INVENTION

Inasmuch as the seal of the invention may be placed in any number of positions within a working environment, that is, the axis of the seal parts may lie in any plane or direction, reference will be made in describing the seal to "axial" and "radial" directions or orientations, with the expression "axially inner" referring to the right as shown in the figures, or that is, toward the sealed region, with "axially outer" applying or relating to a direction away from the sealed region, and "radially inner", referring to the direction lying toward the centerline of the seal and the sealed mechanism.

While the seal of the invention is adaptable to many end uses, a description of a preferred form thereof will be given wherein the sealed mechanism is one drill bit assembly of a plurality of identical or similar drill bits carried on the rotory frame of a "raise bore" drill unit used as a rock drill or the like.

Referring now to the drawings in greater detail, FIGS. 1 and 2 show a seal assembly, generally designated 10 in FIGS. 1 and 2, to be adapted for reception in a part of a rock drill unit, and to have one part thereof adapted for reception in an axially inner seal carrier 12 which is in turn adapted for reception the central bore formed in the end of a rock drill bit 14, and the other portion thereof received in a seal cavity 16 of an axially outer, combinations cover plate and seal carrier unit generally designated 18. The seal itself (see also FIGS. 3 and 4) includes six principal parts and two auxiliary parts, in addition to the carriers 12, 18. As shown, the seal includes an axially inner primary seal ring 20, an axially inner secondary seal ring leaf 22, an axially inner, multi-"wave" spring 24 and as an auxiliary member, a secondary seal clamp ring 26.

The seal also includes, as shown to the left of the components just described, identical axially outer components arranged in reversed or mirror image relation, namely, an axially outer primary seal ring 28, an outer secondary seal ring 30, an outer wave spring 32 and an outer auxiliary clamp ring 34.

In use, oil is retained within a sealed bearing cavity surrounding the spindle on which the bit 14 is journalled. Consequently, before describing the remainder of the seal and its function and detail, it is believed helpful to describe the construction and general operation of the sealed parts, although such construction and operation is known to those skilled in the art.

Accordingly, referring to FIGS. 1 and 2, for example, it will be assumed that the bit head 14 is a part which rotates about a stationary spindle 42, and that the bit 14 includes at least one surface 36 which serves as the outer bearing race for plurality of roller bearings 38. The rollers 38 are in turn received or journaled over an inner race surface 40 forming a part of the spindle 42. Accordingly, in use, the bit 14 and the parts associated therewith, including the axially inner carrier 12, and the seal components 20, 22, 24 and 26 rotate as a unit with the bit 14, while the remaining parts, including the spindle 42, the axially outer cover plate and seal carrier 18, and the seal components 28, 30, 32 and 34 remain fixed.

Referring now to the bit 14 in greater detail, it will be seen to include, in addition to the outer bearing race surface 36, an inner counterbore 44, an inner end face 46, an outer counterbore 48 and an intermediate end face 50. The opening terminates in a beveled or chamfered surface 52 which is provided for ease of installation of the unitized seal assembly 10.

Referring now to the axially inner seal carrier 12, this unit is shown to comprise a drawn or stamped body 54 having an inner edge surface 56, a spring base or perch surface 58 for receiving the spring 24, and a short offsetting surface 60, one part of which helps locate the spring 24. A second or intermediate radial flange 62 is joined at its outer margin to an intermediate cylindrical surface 64, which is adapted to receive and position part of the axially inner secondary seal unit 22, as will appear. An outermost radial flange 66 is also provided, and this unit is connected to an outermost, axially extending mounting element 68. One or more diagonally inwardly extending unitizing "barbs" or tangs 70 are formed from and extend radially inwardly of, the axial flange or surface 68.

From the above, it will be noted that the axially inner seal carrier includes a plurality of radially inwardly and outwardly directed surfaces as well a counterpart axially extending radially facing surfaces, each of which serves its designated function in the seal assembly as a whole.

Referring again to the spindle assembly 42, this unit will be seen to include a flange 72 extending radially outwardly from the spindle body with the flange 72 having plural drive pin bores 74 formed therein. Axially outwardly of the flange 72 is an O-ring groove 76, adapted for reception of an O-ring 78, while still further axially outwardly thereof is a snap ring groove 80 receiving a removable snap ring 82, having an inner end face surface 84 (FIGS. 3 and 4), adapted to bear on and secure an end face 86 of the axially outer end plate and seal carrier 18. The seal carrier itself is preferably a cast and machined unit and includes an inner body portion 88 and an outer body portion 90, with the inner body including a carrier drive pin bore 92 receiving a drive or dowel pin 94. Consequently, the axially outer seal carrier 18 and the spindle 42 remain stationary in use of the drill, with the torque reaction being taken by the provision of the mutually opposed pin bores 74, 92 and the interlocking dowel pin 94 preventing relative rotation.

The outer body 90 of the end cover and carrier 18 includes a principal bore generally designated 96 with an outer diameter 98, and an inner diameter 100, and offset end faces 102, 104. The inner end face 104 and the shoulder formed by the outside diameter 100 cooperate to locate the outer wave spring 32 in its intended position of use, while the end face 102 and the outer bore outer diameter 98 cooperate to receive the secondary seal unit 30.

The tang or barb 70 will be seen to have its end portion received within an axially elongated groove 106 forming the outermost portion of the axially outer carrier 18 and lying radially outwardly of the outer diameter 98 receiving the secondary seal. This tang 70 and groove 106 permit the seal to be preassembled or unitized before final installation.

Referring now in particular to the additional details of the components of the seal proper, some of the constructional details thereof are best illustrated in FIGS. 3 and 4. For simplicity, the axially inner parts are described with reference to FIG. 3 whereas the axially outer parts are numbered in FIG. 4.

Referring now to FIG. 3, the axially inner auxiliary spring 24 is shown to contain first and second elements, 110, 112 arranged in the form of a so-called "wave" or rosette, that is, an axially undulating washer arrangement adapted to act as a spring when placed in compression. Spaced apart portions of the axially outer end face 114 of the spring 110 acts on spaced apart portions an axially inner end face 116 of the axial flange 118 of the inner primary ring 20. Parts of the inner surface 120 of the spring 24 engage and rest upon the casing spring support surface or perch 58. Referring again to the primary seal ring 20, it will be seen to have a generally L-shaped cross-section and to include a radial flange 122 in addition to its axial flange 118. The radially outwardly directed surface 124 of the axial flange 118 serves as a seating surface for the radially inwardly directed, surface 126 on the secondary ring inner flange 128. The radial flange 122 of the primary ring 20 includes an axially outer end face surface 128 and an axially inwardly directed end face surface 130. The outer surface 128 has a seal band area 132 lapped or ground thereon to provide a portion of the primary seal, such surface (FIG. 2) being finished by technique known to those skilled in the art. The surface 131 engages an opposed, counterpart surface 134 forming a part of the secondary seal 22. The remaining surfaces, such as the radially outermost surface 136 (FIG. 2) on the radially outer axial flange 138 of the secondary ring 22 is adapted to engage the inwardly directed portion of the surface 64 on the inner seal carrier 12, where it may be secured by the outwardly acting clamping ring 26. FIG. 1, for example, shows that the inner secondary ring 22 includes an annular bead 140 of enlarged, contoured cross-section.

From the foregoing description, it will be apparent that the secondary seal ring 22 is received within the appropriate cylindrical surface 54 of the inner seal carrier 12, and this in turn serves to suspend or locate the primary seal ring 20. The seal band area 132 on the face 130 of the radial flange 122 provides the primary or relatively movable seal. The unit 20 as a whole is urged into sealing contact with its counterpart unit 28 by the wave spring assembly 24 when the seal unit is preassembled, and subsequently, when it is installed.

Referring now to FIG. 4, the mirror image nature of the other half of the seal may be appreciated, with the outer wave spring 32 being shown to include inner and outer leaves or rings 140, 142 which engage counterpart end face surfaces on the axial flange portion 144 of the primary ring 28. The axially outer secondary seal ring 30 also includes a bead or area of enlarged cross-section 146 as well as the axial and radial flanges, surfaces, etc. of its counterpart 22, being similar thereto in all respects except for the details of its carrier 18. Consequently, in use, it will be seen that with the surface 148 (FIG. 2) on the radial flange 150 of the ring 28 engaging its counterpart 132 on the radial flange 122 of the inner primary ring 20, a primary seal band area is provided, which will serve to permit relative motion while retaining lubricant within, and excluding grit from, the sealed area generally shown as SA in FIGS. 1 and 4, for example.

Referring now to the assembly of the seal unit as a whole, it will be understood that there are two stages or steps involved in such assembly, the first being the assembly of the unitized, cartridged or packaged seal as a whole, and then the subsequent installation of this packaged or unitized seal in the intended application as a drill bit/spindle bearing seal.

For this purpose, FIG. 2 best illustrates certain aspects of the invention. Thus, beginning with the carrier 12, this unit is positioned, and the inner spring 24 is placed therein, resting on the surface 58. For this purpose, it might be envisioned that the axis of the installation is vertical so that the parts may be assembled with the aid of gravity.

Next, the inner secondary ring 22 is assembled with a slight interference or press fit between its inner diameter flange and the outer surface of the axial flange on the primary ring 20. The compressible clamp ring 26 is positioned as shown and these units are then dropped or pressed into place with the surfaces 54, 136 being prelubricated if necessary. The provision of the annular bead 140 insures that the flexible ring 22 is correctly positioned, centering the primary ring 20 with respect to the secondary ring 22 in the desired manner.

Next, it may be envisioned that the second or axially outer carrier 18 is placed on a horizontal surface with its cavity 96 directed upwardly. The spring assembly 32 is placed into the appropriate inner diameter 100 and rests on the end face 104. Thereafter, the secondary and primary rings 28, 30 are assembled as a unit and pressed into place within the outer diameter surface 98 in the carrier 18, with the clamp 34 also providing an outward clamping or pinching force between its outer diameter and the inner surface of its associated axial flange on the secondary member 30. Again, the bead 146 insures that the flanges of the secondary member 30 will be properly aligned so as to center the axially outer primary ring 28 in the desired position of use. With these units so assembled within themselves, the end faces 132, 148 may be prelubricated, in the factory, for example, and the seal then assembled by pushing the outer and inner carriers 12, 18 with their associated seal parts into a position such that the barbs or tangs 70 snap into the groove 106 in the outer diameter of the seal carrier 18. This slightly compresses the spring assemblies 24, 32 which urge the carrier 12, 18 apart; however, the barb 70, by engaging the shoulder 161 (FIG. 4) prevents the seal assembly from coming apart unintentionally. The unitized assembly may then be shipped as a unit to the point of installation.

Assuming now that it is desired to install the unitized seal in place within the application, and that the mechanism has been prepared for such assembly, a new O-ring 78 is positioned in the groove 76, dowel pins 94 are positioned in the receptor openings or bores 92, and aligned with the openings 74 in the flange 72. Then, the seal unit 10 is pressed as a whole into the counterbore, and locked therein with the aid of the snap ring 82. The outer surface of the flange is located by a press fit in the bore 44; there may be a slight clearance between the longer counterbore 48 and the outside diameter of the casing flange 68. The inner margin 97 of the outer carrier 18 engages a shoulder 99 on the spindle 42 when the parts are fully installed or "bottomed out". When fully installed, the seal achieves its design preload, as shown in FIG. 3. During operation, as impacts and vibrations are received by the seal, and as an axial end load is placed on the spindle 42 or the bit 14, and during gradual wear, some axial movement takes place, but the elastomeric and spring components accommodate such movement without leaking. The combination of spring load provided by the secondary seal members and by the spring unit 24, 32 insures that the seal end faces 132, 148 will be kept in snug sealing engagement, regardless of the severity of conditions to which the unit is exposed. The O-ring 78 provides an additional secondary seal, while the snap ring 82 insures that the seal as a whole, particularly the seal carrier 18, will be retained in position in respect to the shaft 42; the press fit of the axially inner carrier 12 in the counterbore 44 in the bit 14 insures that the inner half of the seal and its associated parts remain fixed with respect to their associated mechanisms.

In a preferred application, the secondary seal rings are made from a chemically resistant rubber such as a fluoroelastomer ("Viton") which is flexible and which may supply some axial end face load to the seal. The wave springs 24, 32 apply all or most of the end face load so as to insure reliable sealing without premature wear.

While the invention is not intended to be limited in its operation to any mechanism or theory of operation, it is believed possible that the wave springs provide rapid responses to rapidly applied load forces, and the rubber secondary seal and spring members' configuration may permit them to respond well to gradually applied forces. The abrasion and chemical resistance of the rubber parts insures that grit will be excluded from the seal cavity, and these parts also provide a very strong seal, involving no relative motion, against leakage of oil from the seal cavity.

In keeping with its objects, the seal of the present invention may be unitized at the factory, and after being assembled with care, may be easily and reliably installed in the field. It provides exceptional resistance to failure even under the most severe environmental conditions. The seal increases the longevity of drills considerably by protecting the bearings of these units both by grit exclusion and lubricant retention. The drill bit is shown to be carried by the spindle 42 on cylindrical roller bearings, but tapered rollers may be preferred. The bits 14 may be readily replaced, if necessary, merely by releasing provision of the snap ring 82 and the O-ring 76. The seal may then be replaced as a unit or reinstalled with an old bit. Seal replacement in the field is easy, and very importantly, reliable. In other words, it is difficult or impossible to install the seal incorrectly if reasonable care is taken; instruments or measurements are not required for this purpose and the various locking and engaging surfaces insure that this can be done by "feel", without the need for continual checking or rechecking of forces or dimensions when installation is made. The provision of the auxiliary springs enables the manufacturer to select from a wide variety of secondary seal elastomers suitable for abrasion and chemical resistance without having to rely on them for application of the spring force.

While other materials may be used, in many applications, the primary rings are preferably made from a tough alloy such as "Haynes 93" or the like, tool steel, or other specialty materials, as well as more common materials, coated or uncoated, to achieve compatibility with the working environment. Synthetic materials, such as filled resins or sintered metals may also be used.

The wave springs are preferably made from spring steel, and elastomers other than fluoroelastomers may also be used for the secondary seal if desired.

It will thus be seen that the present invention provides an improved axial end face seal of a unitized design which is adapted to provide numerous advantages and characteristics in use, including those referred to herein, and others which are inherent in the invention. A preferred embodiment of the invention having been set forth by way of example, it is anticipated that changes or modifications may be made to the described embodiment without departing from the spirit of the invention or the scope of the appended claims.

I claim:

1. A seal unit comprising, in combination, a pair of matched seal half assemblies, each half having three principal components including a primary seal ring of generally L-shaped cross-section having spaced apart, radially extending surfaces defining a radial flange and spaced apart axial surfaces defining an axial flange, with the axial flange having a flange end face, and with one radial flange surface being an end face seal band surface adapted for dynamic sealing cooperation with its counterpart on the other seal half, and the other radial flange surface and one axial flange surface cooperating to form an annular seat for an elastomeric secondary sealing ring, an elastomeric secondary seal ring having a generally U-shaped cross-section with radially inner and outer, axially extending flanges connected at their respective ends by a radially extending bight portion, with adjacent surfaces on said inner secondary seal ring flange and said bight portion at least partially engaging said primary ring seat, said radially outer secondary ring flange being adapted for reception in a carrier opening, and an axially acting mechnical spring unit with opposed end faces being adapted to apply an axial end face load to said primary seal ring to urge its end face seal band surface into snug sealing engagement with said counterpart surface, said mechanical spring unit having at least portions of one of its end faces engaging at least portions of said primary seal ring flange end face.

2. A seal unit as defined in claim 1 wherein each of said secondary seal rings includes an axially enlarged, contoured center section of increased axial width forming a part of said bight portion thereof.

3. A seal unit as defined in claim 1 which further includes, for each of said elastomeric secondary seal elements, a seal locating and locking ring made from a stiff but resilient material and being positionable radially inwardly of said radially outer axial flange on said secondary seal member for urging said flange of said secondary seal member into fluid and grit-tight sealing engagement with an associated seal carrier.

4. A seal unit as defined in claim 1 wherein said axially acting spring comprises an annular, axially undulating spring element of circular shape when viewed in end elevation.

5. A seal unit as defined in claim 1 which further includes a seal half carrier for at least one of said seal half units, said carrier being adaptable for removable reception within an associated machine element, said secondary seal being snugly received in said carrier to position said primary seal ring.

6. A seal unit as defined in claim 1 which includes a pair of seal carrier units each carrying one of said seal halves, with each of said carriers having means thereon for locating said carrier with respect to an associated machine element and for fixing it against rotation relative to said element.

7. A seal unit as defined in claim 1 wherein said secondary seal rings are made from a fluoroelastomeric material.

8. A seal unit as defined in claim 1 wherein a carrier is provided for each half seal unit, and cooperating means are provided on said carrier units for unitizing said carriers together so as to permit free but limited relative axial movement thereof and to permit free relative rotational movement thereof.

9. A unitized heavy duty end face seal assembly adapted for use in severe service environments, said unitized seal assembly including a casing unit for carrying a first half seal assembly and a cover unit for carrying a second, substantially identical half seal assembly in opposed facing relation to said first half seal assembly, said casing and said cover being in opposed, spaced apart relation and having thereon mutually interlocking means preventing unintentional axial disassembly of said seal and permitting free rotation of said casing and cover with respect to each other, and free but limited relative axial movement therebetween in the use of said seal, said casing unit being received in said drill bit counterbore, means on at least one interior surface of said casing for receiving and positioning an annular secondary seal element in fluid tight relation, and means on said casing for receiving and positioning an axially compressible mechanical spring, said cover being of annular form, being received over said spindle and locked against unintentional removal therefrom, said cover having at least one interior surface for receiving and positioning a portion of an elastomeric secondary seal ring in fluid tight relation to said cover, and means in said cover for receiving and positioning an axially acting spring forming a part of said half seal, and axially inner and outer, substantially identical half seal units carried respectively by said casing and said cover, each half of said seal units including a primary seal ring of generally L-shaped cross-section and having a seal band forming surface on one end face surface of its radial flange, a secondary seal seat formed by the combination of the radial surface lying opposite said seal band surface, and one of the axial surfaces defining a part of said primary ring, said primary ring also including an end face surface extending between radially inner and outer surfaces defining said axial flange, a secondary seal unit of annular form and generally U-shaped cross-section having radially inner and outer axial flanges joined to each other at a radially extending bight portion, with the outer axial flange being received within the receiving and positioning surface of its associated carrier and with the adjacent axial and radial surfaces of the secondary seal unit engaging said seat in fluid tight relation, and an axially acting mechanical spring disposed between said end face portion of said primary ring axial flange and a portion of its associated carrier, with said mechanical springs thereby urging said primary seal band surfaces into snug, relatively rotatable primary sealing engagement with each other to retain lubricant in said cavity.

10. A unitized seal assembly as defined in claim 9 wherein each of said half seal units includes a radially outwardly acting clamp ring urging said radially outer axial flange of said secondary seal ring into snug engagement with said receiving and positioning surface on its associate carrier.

11. A unitized seal assembly as defined in claim 9 wherein said mutually interlocking means includes a circumferentially extending locking groove in one of said casing and cover members and a spring barb in the other of said cover and casing, said barb and groove permitting said seal to be assembled but not unintentionally disassembled, and to move freely axially within the limits permitted by the width of said locking groove.

12. A unitized seal assembly as defined in claim 9 wherein said cover includes means therein for reception of at least one drive pin adapted to extend between said cover and a relatively fixed non-rotatable part of said sealed mechanism to insure that torque transmitted between said primary seal rings will not cause rotation of said cover relative to said non-rotatable mechanism part.

13. A sealed earth boring drill bit assembly comprising, in combination, a rotary drill bit having a contoured, exterior earth-engaging surface portion, a central bore therein for reception of a mounting bearing, and a counterbore for receiving a seal casing, a drill bit spindle providing a rotary axis for said drill bit, and a bearing disposed between said bit bore and said spindle, a seal unit disposed between said spindle and a portion of said bit, with a lubricant-receiving cavity being defined in part between said spindle, said bit and the interior of said seal, said seal unit including a casing unit for carrying a first half seal assembly and a cover unit for carrying a second, substantially identical half seal assembly in opposed facing relation to said first half seal assembly, said casing and said cover being in opposed, spaced apart relation and having thereon mutually interlocking means preventing unintentional axial disassembly of said seal and permitting free rotation of said casing and cover with respect to each other, and free but limited relative axial movement therebetween in the use of said seal, said casing unit being received in said drill bit counterbore, means on at least one interior surface of said casing for receiving and positioning an annular secondary seal element in fluid tight relation, and means on said casing for receiving and positioning an axially compressible mechanical spring, said cover being of annular form, being received over said spindle and locked against unintentional removal therefrom, said cover having at least one interior surface for receiving and positioning a portion of an elastomeric secondary seal ring in fluid tight relation to said cover, and means in said cover for receiving and positioning an axially acting spring forming a part of said half seal, and axially inner and outer, substantially identical half seal units carried respectively by said casing and said cover, each half of said seal units including a primary seal ring of generally L-shaped cross-section and having a seal band forming surface on one end face surface of its radial flange, a secondary seal seat formed by the combination of the radial surface lying opposite said seal band surface, and one of the axial surfaces defining part of said primary ring, said primary ring also including an end face surface extending between radially inner and outer surfaces defining said axial flange, a secondary seal unit of annular form and generally U-shaped cross-section having radially inner and outer axial flanges joined to each other at a radially extending bight portion, with the outer axial flange being received within the receiving and positioning surface of its associated carrier and with the adjacent axial and radial surfaces of the secondary seal unit engaging said seat in fluid tight relation, and an axially acting mechanical spring disposed between said end face portion of said primary ring axial flange and a portion of its associated carrier, with said mechanical springs thereby urging said primary seal band surfaces into snug, relatively rotatable primary sealing engagement with each other to retain lubricant in said cavity.

* * * * *